UNITED STATES PATENT OFFICE.

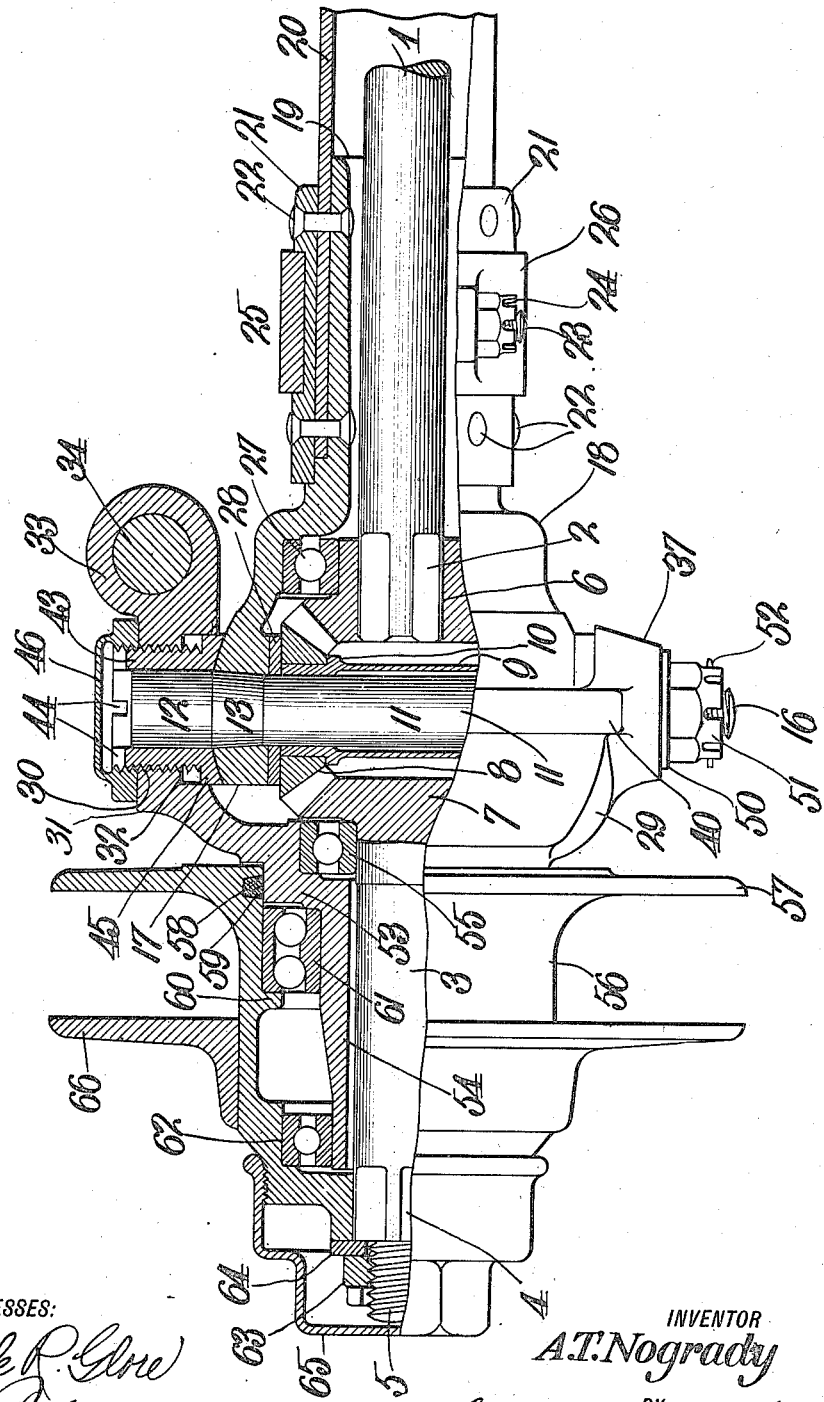

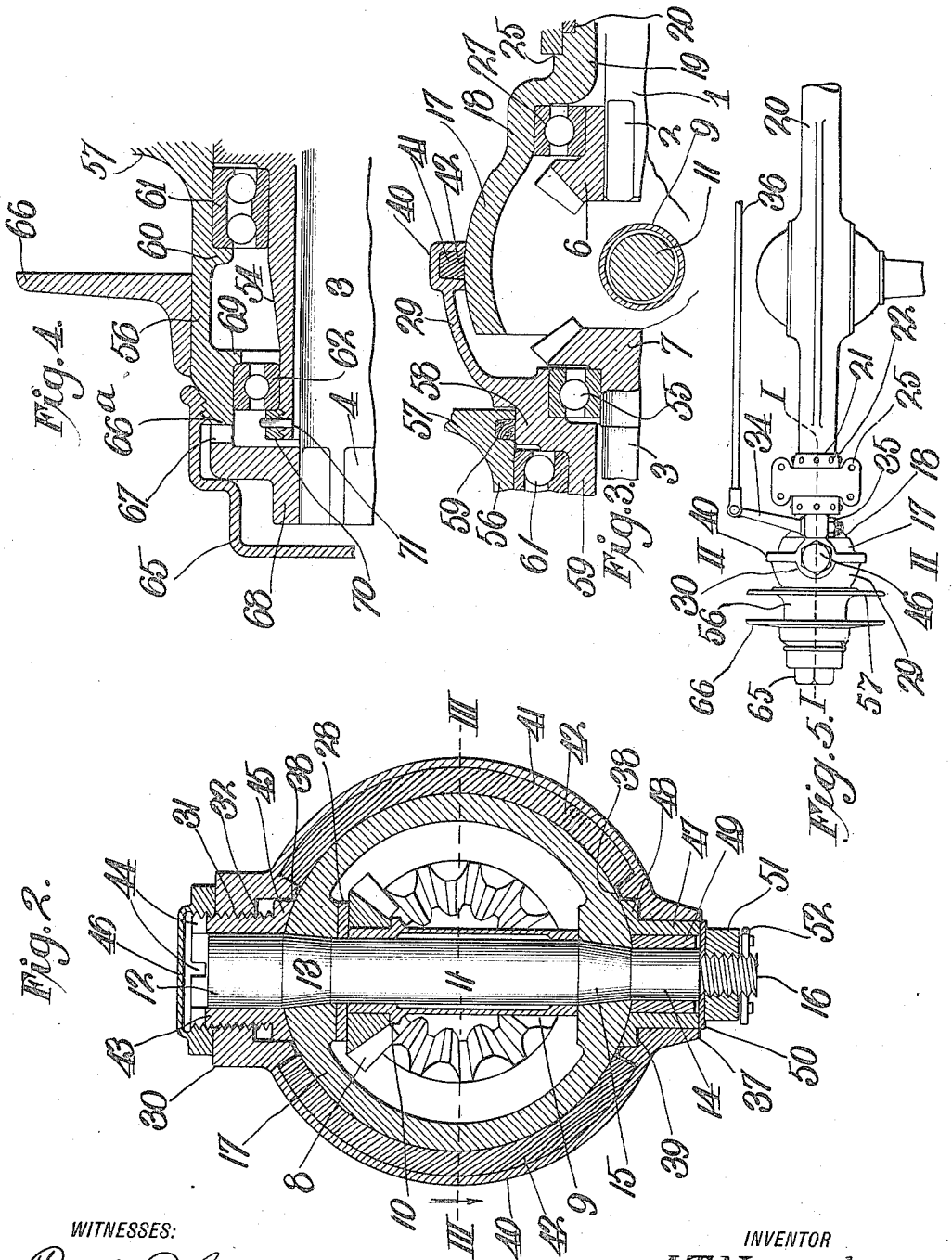

AN DOR T. NOGRADY, OF KANSAS CITY, MISSOURI.

MOTOR-CAR.

1,238,067.   Specification of Letters Patent.   Patented Aug. 21, 1917.

Application filed August 2, 1915.   Serial No. 43,324.

*To all whom it may concern:*

Be it known that I, AN DOR T. NOGRADY, a citizen of the United States, residing at Kansas City, in the county of Jackson and State of Missouri, have invented certain new and useful Improvements in Motor-Cars, of which the following is a specification.

This invention relates to motor cars, and has for its object to produce a dust and oil proof power transmission for the front and rear axles of a motor car, which will perform its function efficiently and possesses the desirable features of simplicity, strength, durability and compactness of contruction.

A further object is to produce a casing which serves as a journal and as a steering knuckle, there being one of such casings for each wheel of the car.

With these and other objects in view as hereinafter appear, the invention consists in certain novel and peculiar features of construction and combinations of parts as hereinafter described and claimed; and in order that the invention may be fully understood reference is to be had to the accompanying drawings, in which:

Figure 1, is a section taken on the line I—I of Fig. 5.

Fig. 2, is a section taken on the line II—II of Fig. 5.

Fig. 3, is a section taken on the line III—III of Fig. 2.

Fig. 4, is a section like that shown by Fig. 1, but of a modified form of construction.

Fig. 5, is a plan view of the major part of an axle housing, the central or hub portion of a wheel, the casing embodying my invention, and the knuckle rod connection.

In the said drawings where like reference characters identify corresponding parts, 1 is the central or major portion of a suitably driven axle of angular form in cross section at each end as shown at 2. 3 is the wheel carrying end of said axle, terminating at its outer end in angular portion 4 and threaded stem 5.

6 is a bevel gear secured on the angular portion 2, and 7 a similar gear formed or secured on the inner end of axle section 3, and meshing with said gears is a bevel gear 8, journaled on a vertical sleeve 9, and prevented from sliding downward by a flange or collar 10 on the said sleeve.

11 is a vertical pivot pin extending through and secured in said sleeve and provided at its upper end with an enlarged cylindrical head 12 connected by a downwardly tapering portion 13 with the body portion 11 of the pin. 14 is a reduced cylindrical lower end for the pin and connected to the body portion thereof by a downwardly tapering portion 15, and provided with a reduced threaded lower end 16.

17 is a circular band of form as though cut from the central portion of a sphere, and provided at diametrically opposite points with tapered openings in which the tapered portions 13 and 15 of the pin, are tightly wedged or secured so that the pin shall be incapable of rotation. At its inner side the band is formed with a reduced or cup-like portion 18, terminating in a cylindrical extension 19 fitting in the adjacent end of the axle housing 20. A pair of sleeve members 21 fit around the telescoped ends of the extension 19 and housing 20, and are secured to said telescoped parts by rivets 22, the said sleeve members being secured together also by the customary bolts 23 and nuts 24, extending through the usual parts 25 and 26 of a seat for one of the springs, not shown, of the car.

A ball-bearing 27 is interposed between the hub of gear 6 and the surrounding cup-like portion of the band 17, and a washer 28 is interposed between gear 8 and the band 17, it being noted that said band is thickened adjacent the pin for strengthening purposes.

29 is a large cup inclosing gear 7 and the band 17, and provided with a boss 30 surrounding the head of the pivot pin and internally threaded at 31. It is also recessed to form a downwardly facing shoulder 32, and provided with a perforated extension 33 in which fits a knuckle or steering arm 34, the same being bolted in place as customary, as shown at 35 and connected at its free end to connecting rod 36 to which power is applied for steering purposes.

The inner end of the boss 30 around the head of the pin, and the inner end of the similar boss 37 around the portion 14 of the pin, fit snugly against the adjacent or peripheral portions of band 17 as at 38, and between the portions 38 at corresponding sides of the pivot, the cup is formed with external ribs 40 providing grooves 41 containing packing 42 for preventing the entrance of dust to and the escape of lubricant from the inclosed gearing and ball-bearings, one of the latter being referred to more particularly hereinafter.

43 is an inverted tubular bolt screwed upwardly in threaded opening 31, and provided with notches 44 at its upper end for engagement by a spanner wrench when adjustment of the bolt is desired. The lower end of the bolt is headed to fit snugly in the recess in the cup 29 below shoulder 32, and the lower face of the bolt is concave to conform to and fit snugly on the convex periphery of the band 17. A cap 46 is screwed upon the upper end of the bolt and prevents dust entering the same.

47 is a headed sleeve fitting in the boss 37 of cup 29, and provided with a flange or head 48 fitting in the recess of said boss overlying shoulder 39 thereof, and fitting on the portion 14 of the pin within the sleeve 47, is a bushing 49. 50 is a washer fitting on stem 16 of the pivot pin and clamped by a nut 51 engaging said stem, against the lower end of sleeve 47, a cross pin or cotter 52 extending through stem 16 and engaging the nut 51—which is of the castellated type—to prevent unscrewing of the same.

The cup 29 is reduced to form the cylindrical portion 53 and the smaller cylindrical portion or sleeve 54. A thrust ball-bearing 55 is arranged between the inner end of shaft section 3 and the reduced portion 53 of cup 29. A hub 56 fits at its inner end on portion 53 of the cup 29 and is provided with a flange 57. It is also provided with an internal groove 58 containing packing 59 engaging the periphery of portion 53 of cup 29, the packing serving to exclude dust from and retain lubricant in the hub. The hub is provided with an internal flange 60 and between the same and the portion 53 of the cup is a ball-bearing 61. The outer end of the hub is closed and fitted on the angular portion 4 of shaft section 3 so as to turn with the latter, and interposed between the hub and the outer end of the sleeve extension 54 of cup 29 is a ball-bearing 62; a nut 63 engaging the threaded portion 5 of the shaft section 3 clamps a washer 64 against the outer end of the hub to guard against dislocation of the same and a dust proof cap 65 is screwed on the outer end of the hub. 66 is the outer flange of the hub, said flange being shrunk or otherwise rigidly secured in place. From the above it will be seen that by removing the cap 65 and nut and washer 63 and 64, the wheel can be removed easily and quickly without disturbing the gear casing constituting the journal for the outer axle section 3 and a part of the steering connection.

In Fig. 4 the cap 65 screws upon the hub, but the latter is not closed at its outer end by an integral portion. Its outer end is toothed as at 66ª and engaged by the toothed portion 67 of a disk 68 mounted nonrotatably on the angular portion 4 of axle section 3, the cap bearing against the outer side of said disk and holding it interlocked with the hub so as to transmit power from the axle to the hub. In this case also the hub has an internal flange 69 bearing against the inner side of the bearing 62, and the latter is held from outward movement by a collar 70 screwed on the outer end of extension 54 and held in place by a pin 71. To remove the wheel, in the construction shown by Fig. 4, it is necessary to remove the cap 65, the disk 68, the collar or nut 70 and the bearing 62.

When the shaft 1 is driven it transmits power through the gear wheels to the outer axle section 3, and thence directly to the one-piece hub of Fig. 1 or to the two-piece hub of Fig. 4. When the wheel is turned through the application of power on rod 36, the tubular bolt 43 and sleeve 47, turn with cup 29 on the stationary pivot pin, and at the same time gear 7 rolls around on gear 8, the action being reversed when the wheel is brought back to its normal position.

It will be apparent that the recess under shoulder 32 of boss 30, is provided to permit of upward adjustment of tubular bolt 43 preliminary to fitting cup 29 operatively over band 17, or to the removal of cup 29, it being obvious by reference to Fig. 1, that it would be impossible to fit the concave ends of the said bolt and the sleeve 47 on bands 17, without making provision for vertical adjustment of the bolt.

From the above description it will be apparent that I have produced a dust and oil proof casing for the gearing and pivot pin of a sectional driven shaft, which embodies the features of advantage enumerated as desirable, and which is susceptible of modification in minor particulars without departing from the spirit and scope of the appended claims.

I claim:

1. In a motor car, a housing terminating in an outwardly opening cup forming a segment of a sphere and provided vertically above and below its center with alined downwardly tapering openings, a pivot bolt extending vertically through said cup and having tapering portions engaging said tapering openings of the cup, an inwardly facing cup fitted over the open end of the first-named cup and provided with an upwardly projecting boss extending around the upper end of the pivot pin and a depending boss extending around the opposite end of the pivot pin, and provided also at opposite sides with grooves, packing strips fitting in said grooves and engaging the exterior surface of the first-named cup with a dust proof relation, a tubular bolt secured in the upwardly projecting boss of the second cup and engaging the upper end of the pivot pin and the adjacent exterior surface of the first-named cup, a sleeve forming a journal for the lower end of the pivot pin and fitting and secured in the depending boss of said second cup and against the exterior surface of the first-named cup, and means for securing the pivot pin reliably clamped to the first-named cup.

2. The combination of a pair of facing cups fitting one within the other and provided with tubular axle portions or stems, a pivot pin extending diametrically through and rigidly secured to the inner cup and constituting a pivot for the outer cup, means to retain the outer cup in operative and oil and dust proof relation to the inner cup without interfering with pivotal movement of the outer cup, an axle housing secured to the stem of the inner cup, a wheel journaled on the stem of the outer cup, means connected to the outer cup to pivotally operate the same to turn said wheel, a gear wheel journaled on the pin within the inner cup, a driving axle within the said housing and projecting into the said inner cup and bearing a journaled relation thereto, a gear wheel secured to said driving axle and meshing with the first-named gear wheel, an axle extending through the stem of the outer cup and secured to said wheel to rotate the same, and bearing a journaled relation to the outer cup, and a gear wheel secured on the inner end of said second axle and meshing with said first-named gear wheel.

In testimony whereof, I affix my signature, in the presence of two witnesses.

AN DOR T. NOGRADY.

Witnesses:
K. M. THORPE,
G. Y. THORPE.